(No Model.)
E. E. FLINT.
STOVE GRATE.
No. 588,859.   Patented Aug. 24, 1897.
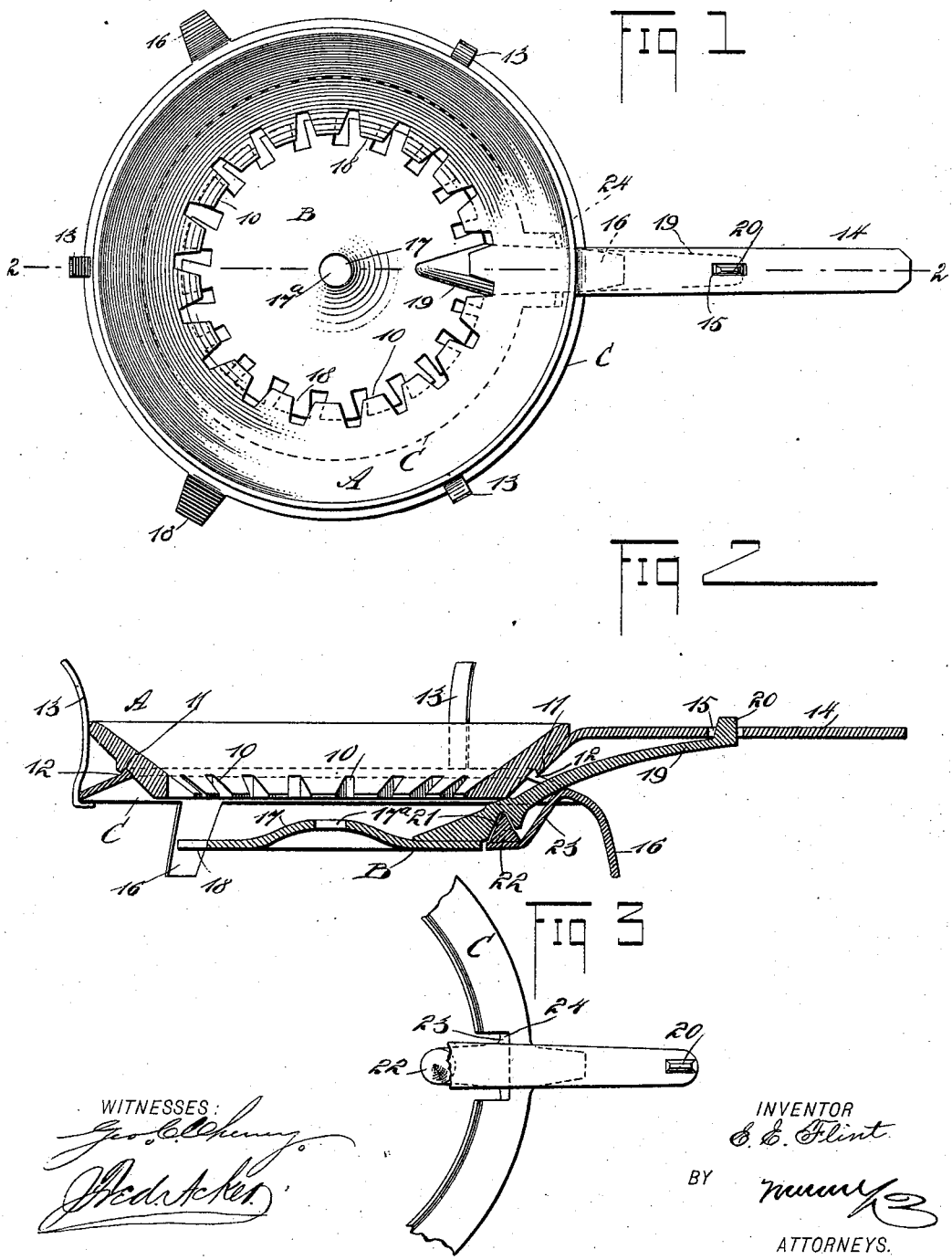
WITNESSES:
INVENTOR
E. E. Flint
BY
ATTORNEYS.

UNITED STATES PATENT OFFICE.

EDMUND EMORY FLINT, OF TONAWANDA, NEW YORK.

STOVE-GRATE.

SPECIFICATION forming part of Letters Patent No. 588,859, dated August 24, 1897.

Application filed February 23, 1897. Serial No. 624,520. (No model.)

*To all whom it may concern:*

Be it known that I, EDMUND EMORY FLINT, of Tonawanda, in the county of Erie and State of New York, have invented a new and Improved Stove-Grate, of which the following is a full, clear, and exact description.

The object of my invention is to provide a grate for coal-stoves which will virtually constitute an extension of the fire-pot, and to so construct the grate that when shaken it will effectually grind all cinders that may be between its sections and throw any such material as slate out from the marginal portion of the grate, thereby promoting the draft and effectually preventing the portion of the grate through which the ashes are to escape from becoming permanently clogged, as sometimes happens, or clogged in any detrimental manner.

Another object of the invention is to construct a grate for coal-stoves capable of the foregoing results and which will be simple, durable, and economic, and readily applied to any stove.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved grate. Fig. 2 is a longitudinal vertical section taken on the line 2 2 of Fig. 1, and Fig. 3 is a plan view of a portion of the supporting-ring for the grate and a portion of the arm connected with the lower or pan section of the grate.

The grate is made practically in three parts, a rim A, a lower or pan section B, and a support C. The rim A is circular and is deeply cupped, its lower or inner edge being provided with teeth 10, and a rib 11 is formed upon the outer face of the rim about midway between its upper and its lower edge, as is best shown in Fig. 2. A ring C is adapted as a support for the rim A. Said ring is given an upward inclination from its outer edge inward, as is also shown in Fig. 2, and upon its upper surface at its inner edge a flange 12 is made, which has bearing against the rib 11 of the rim. Guide-arms 13 are projected upward from the outer edge of the ring to a sufficient height to engage with the upper surface of the rim.

A handle 14 is secured to the rim, provided with a slot 15, and the rim may be supported a predetermined distance above the bottom of the stove by legs 16, or it may be otherwise fastened in the stove, if found desirable. The pan B is in the shape of a disk and is preferably of slightly greater diameter than the smallest diameter of the rim. The said pan is usually provided with an upwardly-arched central section 17, in which an opening 17ª is centrally made, while teeth 18 are made in the periphery of the pan. A handle 19 is secured to the pan near one of its edges, said handle terminating at its outer end in a lug 20, which is shaped to enter the slot 15 in the handle of the rim.

In the under face of the lower portion of the handle 19 a conical socket 21 is made, which receives a conical pivot 22, the said pivot being supported at the end by a tongue 23, projected downward from the front portion of the supporting-ring C, as shown in Figs. 2 and 3, and that portion of the tongue upon which the pivot 22 is placed is horizontal, or substantially in lateral alinement with the peripheral portion of the pan B. A recess 24 is made in the supporting-ring C (shown in Fig. 3) just above the tongue 23, the recess admitting of the outward and upward passage of the handle 19.

It will be observed that under this construction of grate the pan and the rim will move together, the rim having an oscillating movement in a horizontal plane, while the pan will likewise have an oscillating movement in a horizontal plane below the rim. As the pivot about which the pan or lower grate swings is located between the handle and the axis about which the rim or upper grate oscillates it follows that the two grate-sections will swing in opposite directions, and the lower grate will at the same time move through a greater angle than the upper grate. Therefore any material that may be held between the teeth of the pan and the teeth of the rim will be effectually dislodged, and all the lower portion of the body of the fire will be agitated and free from dust. The slate, under the movement of the grate-sections, will naturally slide down from the mass of coal and out between the rim-section and the pan-section of the grate.

It is further obvious that the rim-section of the grate will form a continuation of the fire-pot, since the upper edge of the rim, when the grate is set, is made to closely approach the lower edge of the fire-pot proper.

Having thus described my invention, I claim as new and desire to secure by Letters Patent—

1. The combination of the support having bearings and a stationary pivot, the upper grate-section mounted to oscillate on said bearings and provided with a handle, and the lower grate-section situated beneath the upper section and mounted to oscillate on said pivot, the lower grate-section being connected to the handle, and said stationary pivot being located between the handle and the axis of oscillation of the upper grate-section, substantially as described.

2. The combination of the support having a flange of circular curvature and a stationary pivot below said flange, a rim-shaped upper grate-section having a handle and mounted to oscillate upon said flange and having projections engaging the same, and a pan-shaped lower grate-section situated beneath the upper section and connected to said handle, the lower section being mounted to oscillate upon the pivot, and said stationary pivot being located between the handle and the axis of oscillation of the upper grate-section, substantially as described.

3. The combination of the support having a stationary pivot and a flange of circular curvature inclined inwardly toward its upper edge, a rim-shaped upper grate-section inclined inwardly toward its lower edge and mounted to oscillate upon said inclined flange, and a pan-shaped lower grate-section beneath the upper grate-section and mounted to oscillate upon said stationary pivot, the upper grate-section having a handle, and the lower grate-section being connected to said handle, substantially as described.

EDMUND EMORY FLINT.

Witnesses:
ARTHUR J. BALDWIN,
EMMA M. ROOT.